United States Patent
Mane et al.

(10) Patent No.: US 12,062,081 B2
(45) Date of Patent: *Aug. 13, 2024

(54) GENDER ATTRIBUTE ASSIGNMENT USING A MULTIMODAL NEURAL GRAPH

(71) Applicant: Walmart Apollo, LLC, Bentonville, AR (US)

(72) Inventors: Mansi Ranjit Mane, Sunnyvale, CA (US); Anirudha Sundaresan, Sunnyvale, CA (US); Aditya Mantha, Sunnyvale, CA (US); Stephen Dean Guo, Saratoga, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,862

(22) Filed: Jan. 31, 2023

(65) Prior Publication Data

US 2023/0177591 A1    Jun. 8, 2023

Related U.S. Application Data

(63) Continuation of application No. 16/779,545, filed on Jan. 31, 2020, now Pat. No. 11,587,139.

(51) Int. Cl.
     *G06Q 30/0601*      (2023.01)
     *G06F 16/901*      (2019.01)
     (Continued)

(52) U.S. Cl.
     CPC ..... *G06Q 30/0631* (2013.01); *G06F 16/9024* (2019.01); *G06F 16/906* (2019.01);
     (Continued)

(58) Field of Classification Search
     CPC .... G06F 16/906; G06F 16/9024; G06F 40/20; G06N 3/0481; G06Q 30/0603
See application file for complete search history.

(56) References Cited

U.S. PATENT DOCUMENTS

| | | |
|---|---|---|
| 8,645,224 B2 | 2/2014 | Engle |
| 10,373,618 B2 | 8/2019 | Mohajer et al. |
| | (Continued) | |

OTHER PUBLICATIONS

"Multi-modal Embedding for Main Product Detection in Fashion", IEEE International Conference on Computer Vision Workshops (ICCVW), 2017) (Year: 2017).*

(Continued)

*Primary Examiner* — Apu M Mofiz
*Assistant Examiner* — Farhad Agharahimi
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, cause the one or more processors to perform functions including: receiving a respective item description and at least one respective attribute value for each item of a set of items; generating at least one respective text embedding; generating a graph of the set of items based on at least co-view data to create pairs of items that are co-viewed by joining respective pairs of items; training the text embedding model and a machine learning model using a neural loss function based on the graph; and automatically determining, using the machine learning model, as trained, a label for each item of the set of items. Other embodiments are disclosed.

20 Claims, 11 Drawing Sheets

(51) Int. Cl.
*G06F 16/906* (2019.01)
*G06F 40/20* (2020.01)
*G06N 3/048* (2023.01)

(52) U.S. Cl.
CPC ............ *G06F 40/20* (2020.01); *G06N 3/048* (2023.01); *G06Q 30/0603* (2013.01)

(56) References Cited

U.S. PATENT DOCUMENTS

| | | |
|---|---|---|
| 2003/0028451 A1 | 2/2003 | Ananian |
| 2018/0121988 A1 | 5/2018 | Hiranandani et al. |
| 2019/0026812 A9 | 1/2019 | Levy et al. |
| 2019/0385054 A1* | 12/2019 | Zuev ...................... G06F 40/30 |
| 2020/0234086 A1* | 7/2020 | Taha ....................... G06N 3/08 |
| 2020/0279105 A1* | 9/2020 | Muffat ..................... G06N 3/08 |
| 2020/0311798 A1* | 10/2020 | Forsyth ............ G06V 30/19147 |
| 2020/0320769 A1* | 10/2020 | Chen .................... G06V 10/454 |
| 2021/0264203 A1* | 8/2021 | Fuxman ............... G06K 9/6256 |

OTHER PUBLICATIONS

"Multi-modal Embedding for Main Product Detection in Fashion", IEEE International Conference on Computer Vision Workshops (ICCVW), 2017) (Year: 2017) 2017.

\* cited by examiner

FIG. 11

GENDER ATTRIBUTE ASSIGNMENT USING A MULTIMODAL NEURAL GRAPH

CROSS-REFERENCE TO RELATED APPLICATIONS

This application is a continuation of U.S. application Ser. No. 16/779,545, filed Jan. 31, 2020. U.S. application Ser. No. 16/779,545 is incorporated herein by reference in its entirety.

TECHNICAL FIELD

This disclosure relates generally relates to a gender attribute assignment using a multimodal neural graph.

BACKGROUND

Items in an item catalog often have attributes values that describe the item. Items often do not have a gender attribute value. Adding gender attribute values to items in a catalog database can be a time-consuming manual process.

BRIEF DESCRIPTION OF THE DRAWINGS

To facilitate further description of the embodiments, the following drawings are provided in which:

FIG. 11 illustrates an exemplary interface of a webpage showing a list of recommended items based on a female gender label for each item.

Figure 1:
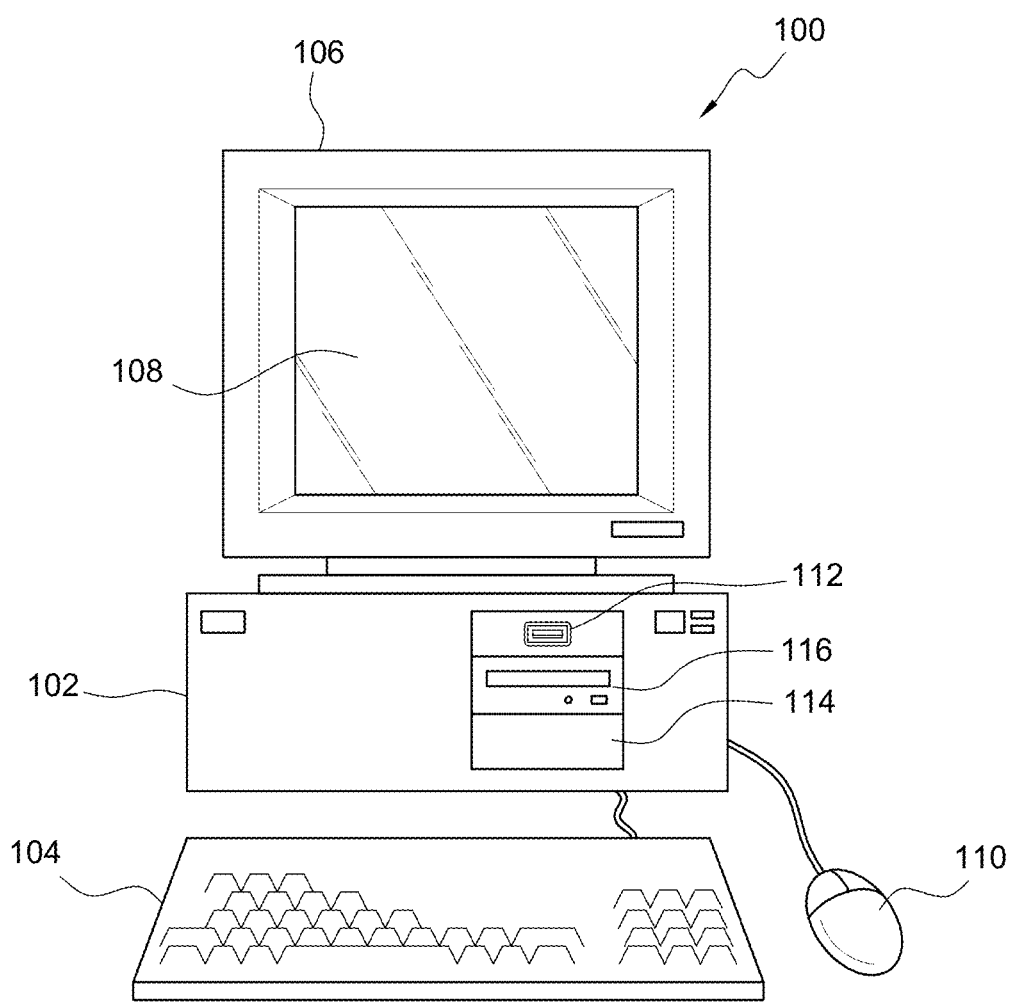
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In many embodiments, gender attribute assignment can be used to provide a gender label for an item. The gender label can be a gender attribute of the item.

Figure 2:
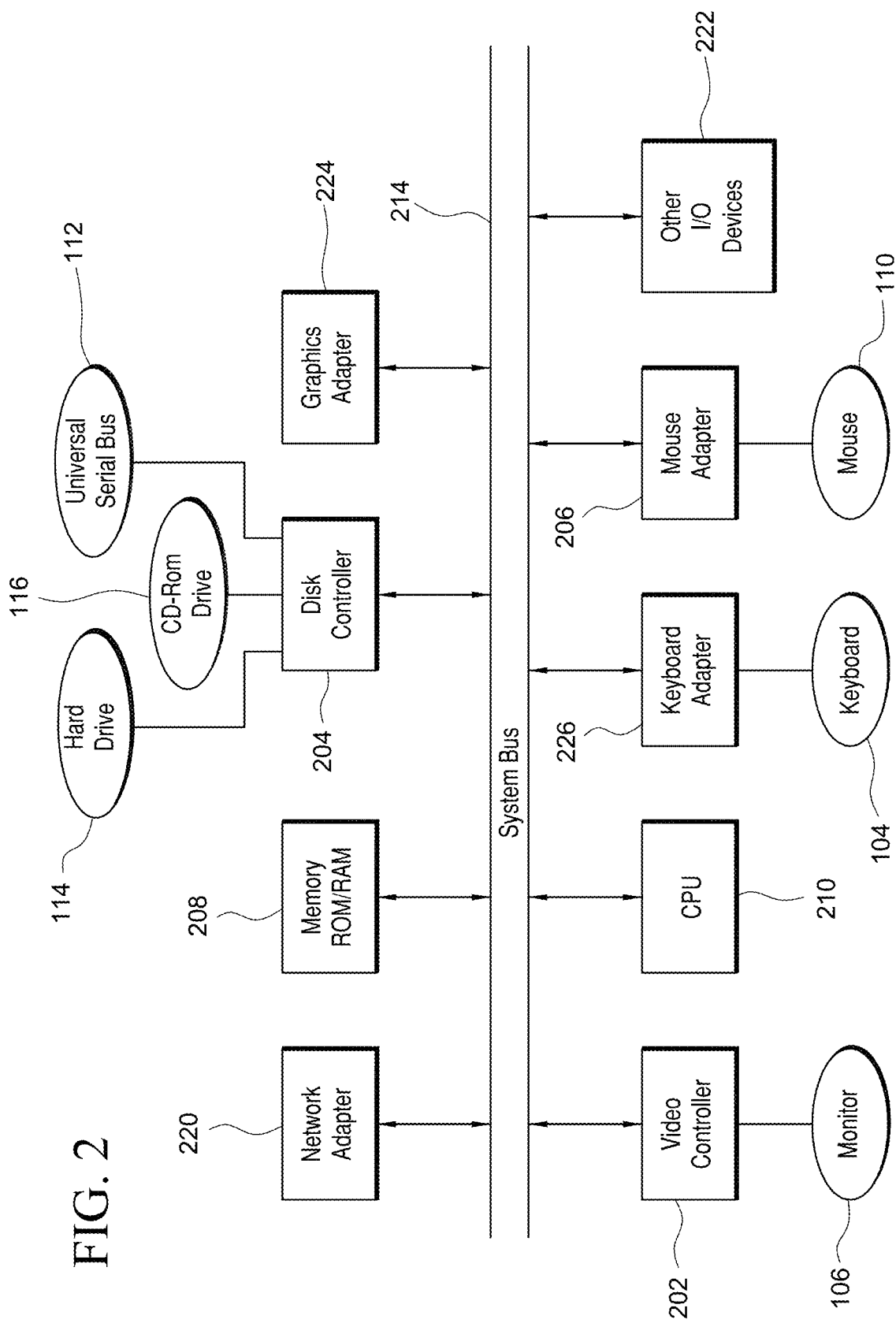
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
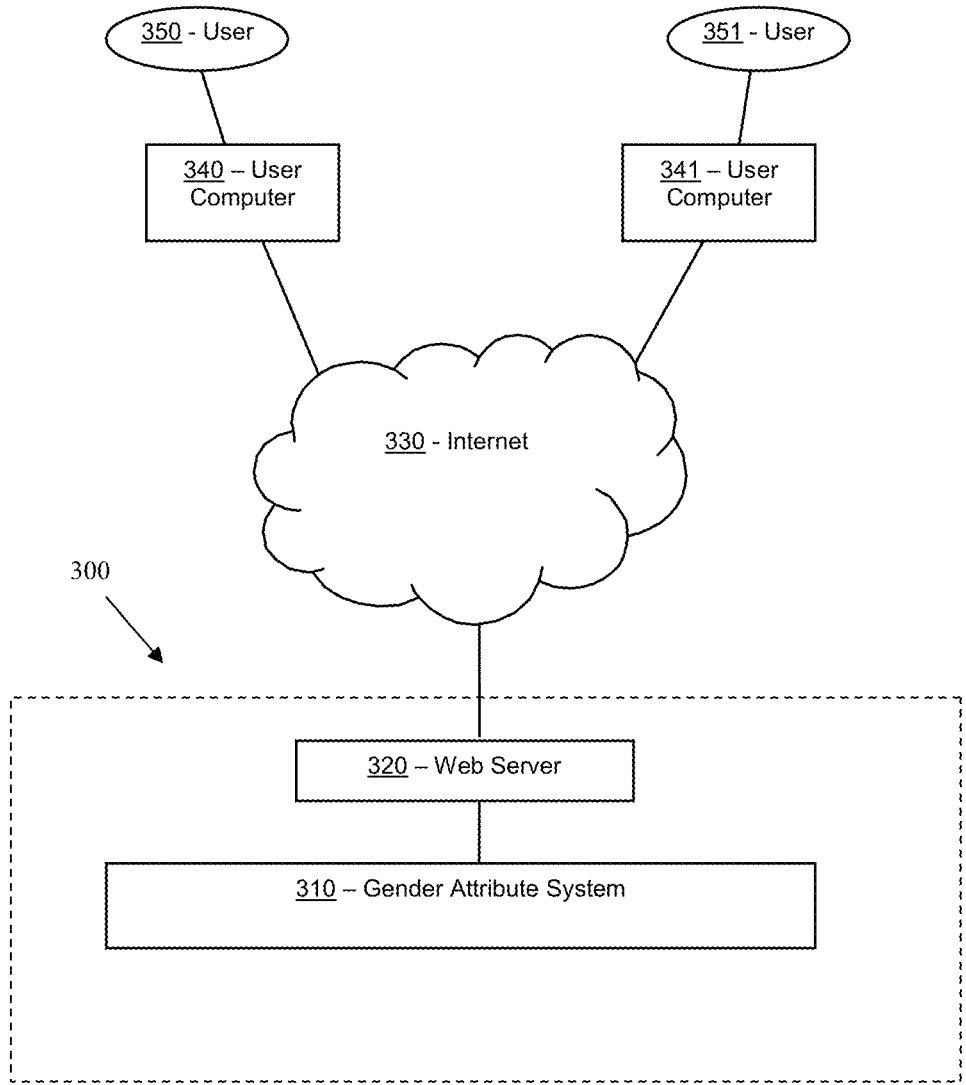
FIG. 3 illustrates a block diagram of a system that can be employed for gender attribute assignment using a multimodal neural graph, according to an embodiment.

Turning ahead in the drawings, FIG. 3 illustrates a block diagram of a system 300 that can be employed for a gender attribute assignment using a multimodal neural graph, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a gender attribute system 310 and/or a web server 320. Gender attribute system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, gender attribute system 310 and/or web server 320. Additional details regarding gender attribute system 310 and/or web server 320 are described herein.

In a number of embodiments, each of gender attribute system 310 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., web sites) that allow users to browse and/or search for items (e.g., products), to add items to an electronic shopping cart, and/or to order (e.g., purchase) items, in addition to other suitable activities.

In some embodiments, an internal network that is not open to the public can be used for communications between gender attribute system 310 and/or web server 320 within system 300. Accordingly, in some embodiments, gender attribute system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, gender attribute system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to gender attribute system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of gender attribute system 310 and/or web server 320. In a similar manner, the processors and/or the non-transitory computer-readable media can be local and/or remote to each other.

Meanwhile, in many embodiments, gender attribute system 310 and/or web server 320 also can be configured to communicate with and/or include one or more databases and/or other suitable databases. The one or more databases can include an item database that contains information about items or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between gender attribute system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, gender attribute system 310 can be a general-purpose computer or a special-purpose computer programmed to perform specific functions and/or applications.

Figure 4:
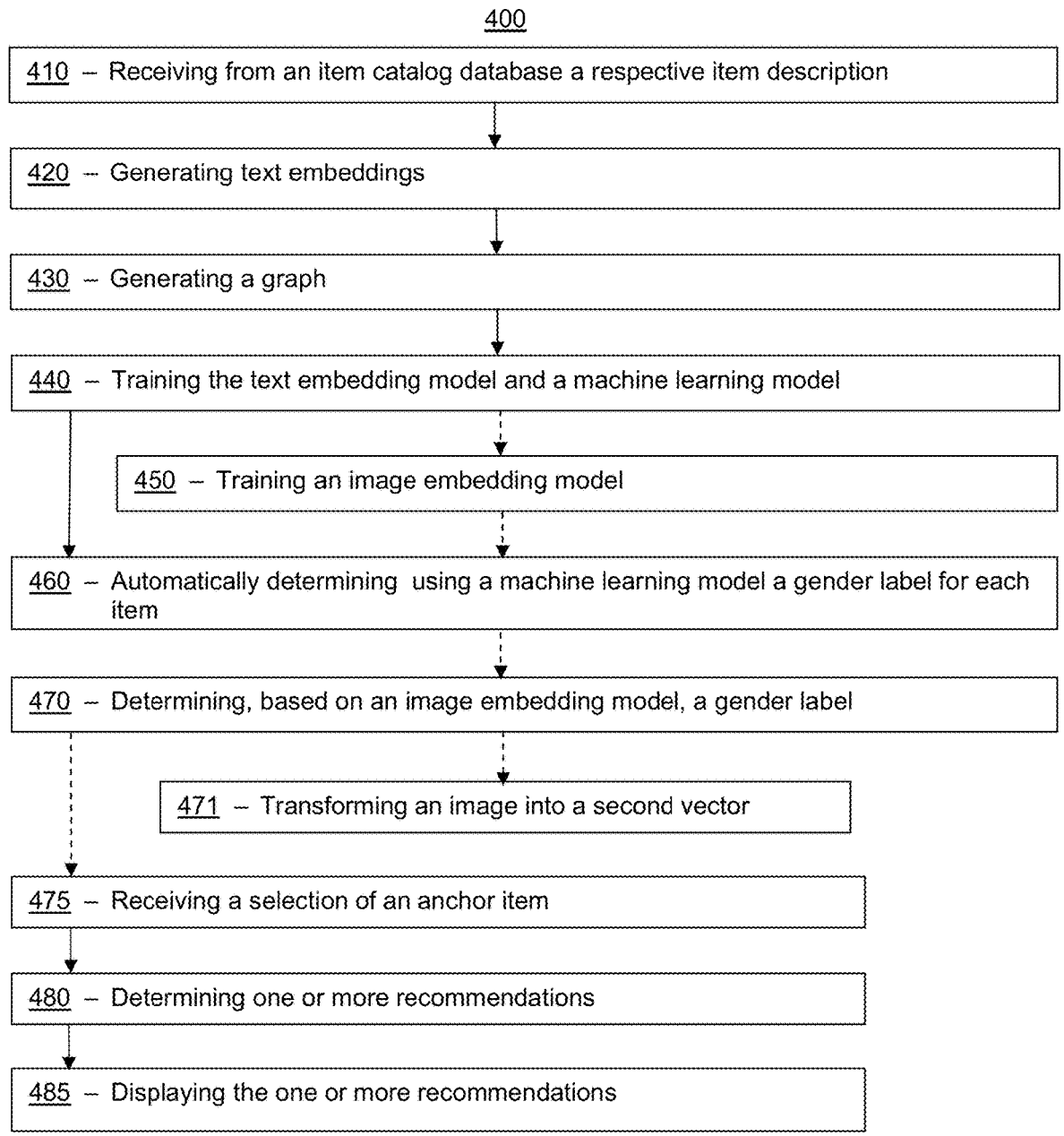
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically assigning a gender label to gender attributes of an item. In many embodiments, determining a gender label to assign to an item can be implemented based on a multimodal neural graph. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as gender attribute system 310 and/or web server 320. The processor(s) can be similar or identical to the processor(s) described above with respect to computer system 100 (FIG. 1).

Referring to FIG. 4, method 400 can include a block 410 of receiving from an item catalog database a respective item description and respective attribute values for each item of a set of items. In many embodiments, a gender classification of the respective attribute values for the each item of the set of items is either labeled or unlabeled. In some of these embodiments, when the gender classification is unlabled, then the gender classification can be missing. In a number of embodiments, the gender classification can include a male gender label, a female gender label, or a unisex gender label.

In some embodiments, method 400 also can include a block 420 of generating text embeddings using a text embedding model to represent the respective item description and the respective attribute values for the each item of the set of items. In many embodiments, text descriptions and item attributes for an item can be item data from an item database. In some embodiments, images of items can be image data from the item database. In many embodiments, the text embeddings can be based on the text of the attribute values (e.g., attributes) for each of the items, such attributes as brand, color, age demographics, age group, fabric material, size, pattern, item type, keywords, and other suitable attributes. In some embodiments, the text of the attribute values can be preprocessed (e.g., normalized) by converting the text to lower case and removing words frequently used in the text (e.g., stop words).

In several embodiments, the text embedding model can be a Bidirectional Encoder Representations from Transformers ("BERT"). In some embodiments, an output from the text embedding model can include a vector representation. In some embodiments, the vector representation can be the text descriptions of at least item attributes for an item transformed to a vector representation using BERT and/or another suitable vector encoder.

In many embodiments, method 400 further can include a block 430 of generating a graph of the set of items from the item catalog database connected by a set of edges. In some embodiments, each pair of items of the set of items that is connected by a respective edge of the set of edges in the graph has been viewed together in one or more respective sessions. In various embodiments, the respective edge can include a weight comprising a co-view count. In a number of embodiments, the set of edges can include (a) one or more unlabeled-unlabeled edges, (b) one or more labeled-unlabeled edges, and (c) one or more labeled-labeled edges.

In several embodiments, items from a same gender together can be viewed together more frequently than items from another gender during a single visit (e.g., session) to a website. In many embodiments, a gender label for an item on a graph can be propagated to another unlabeled item on the graphs. For example, a gender label for a red dress on the graph can be propagated to other dresses connected to the red dress on the graph. In various embodiments, propagating the gender label from one item to another on the graph can be used for training data for the text embedding model to predict the gender label, and training the data for the text embedding model can be based on the attribute information of the one item. In some embodiments, an item with as assigned gender label can include gender attribute values. In several embodiments, an unlabeled item without a gender label can include no gender attribute values. In various embodiments, an unlabeled item can include a conflict in labels or an inconsistency between attribute values.

In several embodiments, generating a graph of the set of items from the item catalog database connected by a set of edges can include vertices and/or nodes in the graph that represent item vectors. In many embodiments, an edge can be created between the vertices when two items (e.g., products) are viewed together in a visit to a website. In some embodiments, a weight can be applied to an edge to account for a co-view count of items viewed together during a visit to a website. In many embodiments, the co-view count can include a number of times an item was co-viewed with another item over a predetermined number of sessions. In some embodiments, the set of edges connecting two vertices can be defined as sets of unlabeled-unlabeled edges (e.g., $\varepsilon_{UU}$), sets of labeled-unlabeled edges (e.g., $\varepsilon_{LU}$), and/or sets of labeled-labeled edges, (e.g., $\varepsilon_{LL}$). In many embodiments, a graph of a set of items representing item vectors can be defined as shown in equation 1:

$$G=(V,E,W) \qquad \text{Equation (1)}$$

where G represents a graph of a set of items connecting pairs of co-viewed items, V represents vertices (e.g., nodes), E represents edges, and W represents weights applied to the edges, such as based on a co-view count.

In some embodiments, co-view data can include historical transactions stored in a transaction database. In many embodiments, creating a graph can be based on co-view data to create the pairs of items that are co-viewed by joining together the pairs of items with edges. The joining of the pairs of items with edges can be based on whether a gender label was assigned to an item (e.g., node).

In various embodiments, method 400 additionally can include a block 440 of training the text embedding model and a machine learning model using a neural loss function based on the graph.

In some embodiments, block 440 of training the text embedding model and the machine learning model using the neural loss function based on the graph can include training the machine learning model with the neural loss function based on first distances between first text embeddings for first pairs of nodes connected by the one or more labeled-labeled edges, second distances between second text embeddings for second pairs of nodes connected by the one or more labeled-unlabeled edges, third distances between third text embeddings for third pairs of nodes connected by the one or more unlabeled-unlabeled edges, and a softmax loss cost function for fourth text embeddings of nodes of the graph that are labeled.

In many embodiments, block 440 of training the text embedding model and a machine learning model using a neural loss function based on the graph can include determining distances between text embeddings and pairs of nodes connected by the one or more edges, such as labeled-labeled, labeled-unlabeled, and/or unlabeled-unlabeled edges. In some embodiments, input for training data can include hyperparameters. In some embodiments, training text embeddings using a text embedding model can be determined using equation 2.

$$L(Y, Z) = \alpha_1 \sum\nolimits_{(u,v) \in \varepsilon_{LL}} w_{uv} d(h_\theta(y_u), h_\theta(y_v)) +$$
$$\alpha_2 \sum\nolimits_{(u,v) \in \varepsilon_{LU}} w_{uv} d(h_\theta(y_u), h_\theta(y_v)) +$$
$$\alpha_3 \sum\nolimits_{(u,v) \in \varepsilon_{UU}} w_{uv} d(h_\theta(y_u), h_\theta(y_v)) + \sum\nolimits_{n=1}^{V} c(h_\theta(y_n), z_n)$$

Equation (2)

where Y represents inputs (attributes), Z represents an output of an gender label (male, female, or unisex), d represents a distance between vector representations between two nodes, $w_{UV}$ represents a weight of the edges between node u and node v, $\alpha_1$, $\alpha_2$, $\alpha_3$ represent hyperparameters, $h_\theta(y_u)$ represents BERT output for node u, and $h_\theta(y_v)$ represents BERT output for node v, $\varepsilon_{UU}$ represents sets of unlabeled-unlabeled edges, $\varepsilon_{LU}$ represents sets of labeled-unlabeled edges, $\varepsilon_{LL}$ represents sets of labeled-labeled edges, c represents a cost function, n represents vertices, and V represents the set of vertices (e.g., nodes).

In some embodiments, vector representations can be used to determine neural graph loss between pairs of items that are labeled-labeled edges, as shown in equation 3:

$$\alpha_1 \Sigma_{(u,v) \in \varepsilon_{LL}} w_{uv} d(h_\theta(y_u), h_\theta(y_v))$$

Equation (3)

In many embodiments, vector representations can be used to determine a neural graph loss between pairs of items that can be labeled-unlabeled edges, as shown in equation 4:

$$\alpha_2 \Sigma_{(u,v) \in \varepsilon_{LL}} w_{uv} d(h_\theta(y_u), h_\theta(y_v))$$

Equation (4)

In various embodiments, vector representations can be used to determine neural graph loss between pairs of items that can be unlabeled-unlabeled edges as shown in equation 5.

$$\alpha_3 \Sigma_{(u,v) \in \varepsilon_{LL}} w_{uv} d(h_\theta(y_u), h_\theta(y_v))$$

Equation (5)

In many embodiments, softmax loss for labeled nodes can be determined using equation 6.

$$\sum\nolimits_{n=1}^{V} c(h_\theta(y_n), z_n)$$

Equation (6)

In several embodiments, method 400 optionally can include block 450 of training an image embedding model based on images of items from the item catalog database using loss equations to minimize a distance between text representations and image representations for the items. In many embodiments, block 450 can be implemented as shown in method 800 of FIG. 8 and described below.

In some embodiments, determining a structured loss, including a deep structured loss, can be used as training data in a machine learning model, as trained, can be determined using equation 7.

$$L(X, Y) = \sum_{i,j,k} \max [0, m + d(x_i, y_j) - d(x_i, y_k)] +$$
$$\lambda_1 \sum_{i',j',k'} \max [0, m + d(x_{j'}, y_{i'}) - d(x_{k'}, y_{i'})] +$$
$$\lambda_2 \sum_{i,j,k} \max [0, m + d(x_i, x_j) - d(x_i, x_k)] +$$
$$\lambda_3 \sum_{i',j',k'} \max [0, m + d(y_{i'}, y_{j'}) - d(y_{i'}, y_{k'})]$$

Equation (7)

where m, $\lambda_1$, $\lambda_2$, $\lambda_3$ represent hyper parameters, d represents a distance function, and i, j, k, represent index for elements in a set.

In many embodiments, a bi-directional ranking constraint can be used as a variable for generating a structured loss can be determined using equations 8 and 9.

$$d(x_i, y_j) + m < d(x_i, y_k) \forall y_j \in Y_i^+, \forall y_k \in Y_i^-$$

Equation (8)

where $x_i$ represents a training image $Y_i^+$ represents a positive sentence, and $Y_i^-$ represents a negative sentence.

$$d(x_j, y_i) + m < d(x_k, y_i) \forall x_j \in X_i^+, \forall x_k \in X_i^-$$

Equation (9)

where $y_{i'}$ represents a training sentence, $X_i^+$ represents a positive image, and $X_i^-$ represents a negative image.

In many embodiments, structure-preserving constraints can be used as a variable for generating a structured loss can be determined by equations 10 and 11.

$$d(x_i, x_j) + m < d(x_i, x_k) \forall x_j \in N(x_i), \forall x_k \notin N(x_i)$$

Equation (10)

where $N(x_i)$ represents images described by the same sentence as $x_i$, and $N(y_{i'})$ represents sentences describing the same image as $y_{i'}$.

$$d(y_i, y_j) + m < d(y_i, y_k) \forall y_j \in N(y_{i'}), \forall y_k \notin N(y_{i'})$$

Equation (11)

In many embodiments, softmax loss can apply to labeled nodes and not apply to unlabeled nodes.

In many embodiments, method 400 further can include a block 460 of automatically determining, based on the machine learning model, as trained, a gender label for each first item of the set of items in which the gender classification is unlabeled and in which a respective quantity of respective attribute values for the each first item is at least a predetermined threshold In some embodiments, method 400 additionally can include an optional block 470 of determining, based on an image embedding model, as trained, a gender label for each second item of the set of items that does not meet the predetermined threshold. In many embodiments, image data can be used for predicting a gender label for an item when an item has less than five (5) item attributes.

In various embodiments, method 400 also can include an optional block 471 of transforming an image into a second vector representing the image using a residual neural network ("ResNet"). In many embodiments, transforming an image into a second vector can include extracting images and/or item images from item attributes.

Figure 8:
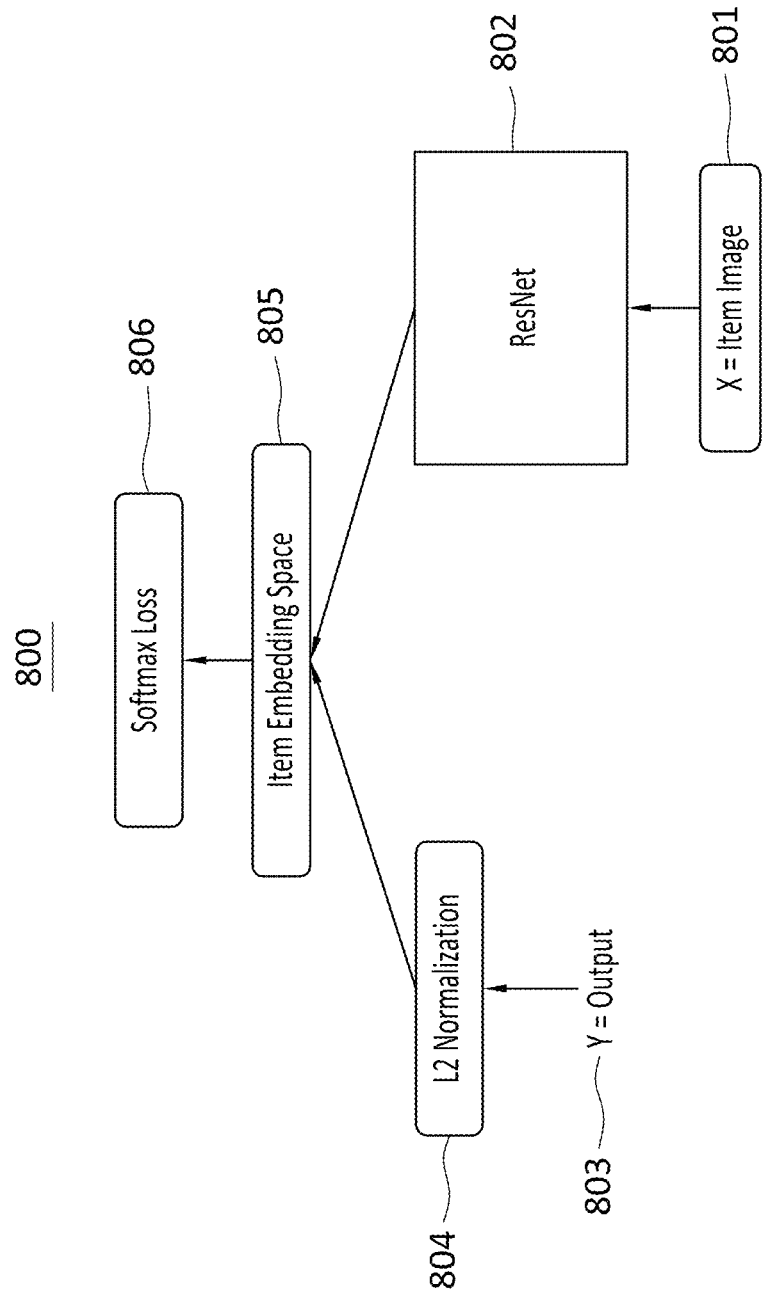
FIG. 8 illustrates a flow chart for a method, according to another embodiment.
Figure 9:
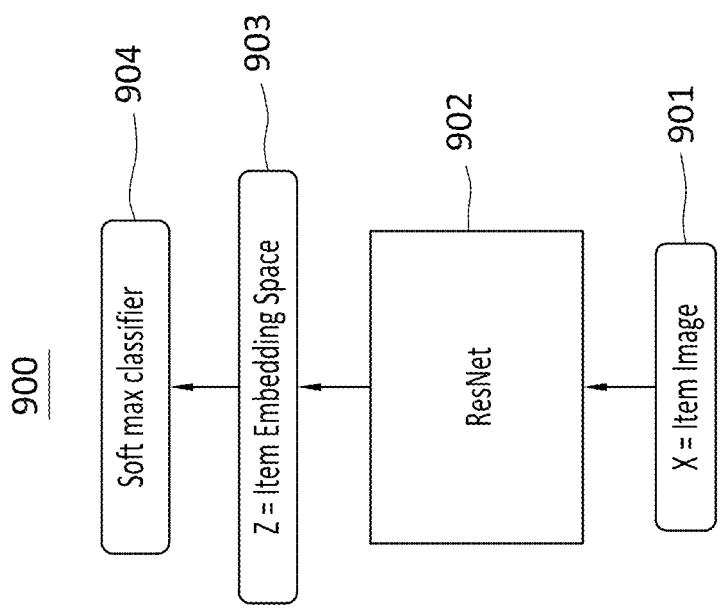
FIG. 9 illustrates a flow chart for a method, according to another embodiment.

In many embodiments, training image embeddings can include text vector representations and image vector representing input into an item embedding space, as shown in FIGS. 8 and 9 and described below.

In some embodiments, method 400 further can include an optional block 475 of receiving a selection of an anchor item from a user. In a number of embodiments, the anchor item can include a first gender label.

In several embodiments, method 400 additionally can include an optional block 480 of determining one or more recommended items that match the first gender label based on the gender labels determined by the machine learning model.

In a number of embodiments, method 400 also can include an optional block 485 of sending instructions to display the one or more recommended items to the user.

Figure 5:
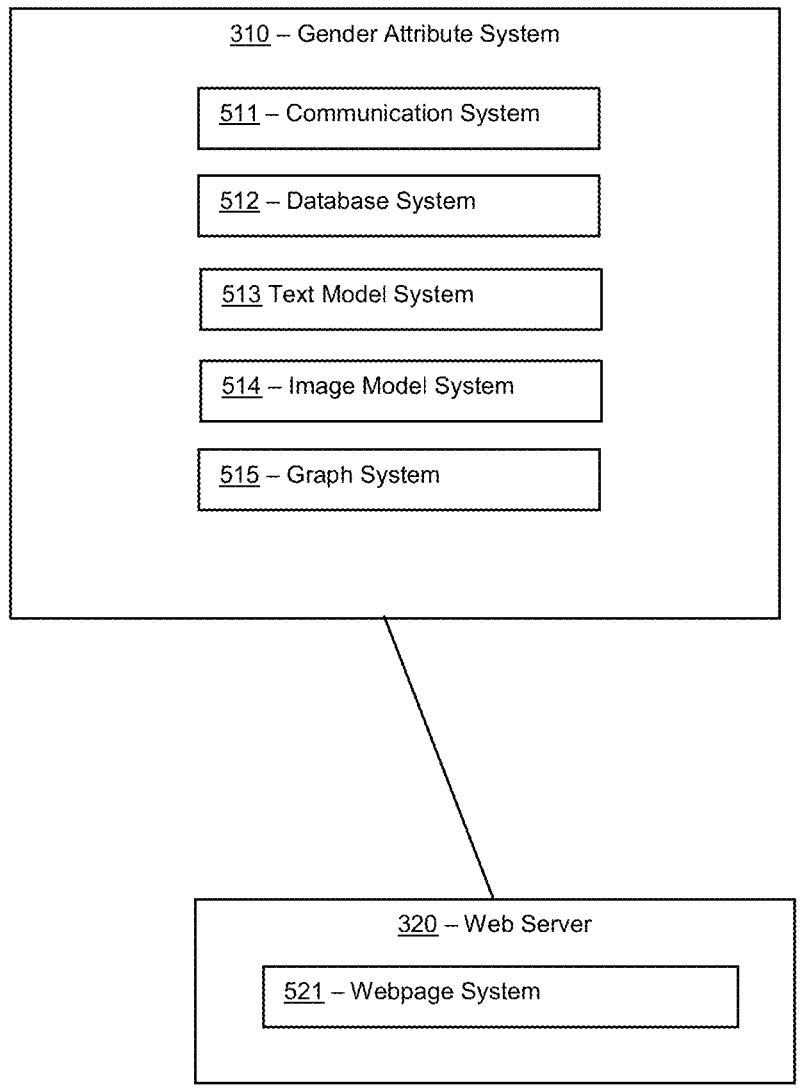
FIG. 5 illustrates a representative block diagram for a system according to the embodiment of FIG. 3.

Turning to the next drawing, FIG. 5 illustrates a block diagram of system 300, according to the embodiment shown in FIG. 3. Gender attribute system 310 and/or web server 320 are merely exemplary and are not limited to the embodiments presented herein. Gender attribute system 310 and/or web server 320 can be employed in many different embodiments or examples not specifically depicted or described herein. In some embodiments, certain elements or systems of gender attribute system 310 and/or web server 320 can perform various procedures, processes, and/or acts. In other embodiments, the procedures, processes, and/or acts can be performed by other suitable elements or systems. In many embodiments, the systems of gender attribute system 310 and/or web server 320 can be modules of computing instructions (e.g., software modules) stored at non-transitory computer readable media. In other embodiments, the systems of gender attribute system 310 and/or web server 320 can be implemented in hardware.

In many embodiments, gender attribute system 310 can include a communication system 511. In a number of embodiments, communication system 511 can at least partially perform block 410 (FIG. 4) of receiving from an item catalog database a respective item description and respective attribute values for each item of a set of items, block 475 (FIG. 4) of receiving a selection of an anchor item from a user, and/or block 485 (FIG. 4) of sending instructions to display the one or more recommended items to the user.

In several embodiments, gender attribute system 310 also can include a database system 512. In various embodiments, database system 512 can at least partially perform block 410 (FIG. 4) of receiving from an item catalog database a respective item description and respective attribute values for each item of a set of items, block 475 (FIG. 4) of receiving a selection of an anchor item from a user, block 701 (FIG. 7, described below) of retrieving attributes and item data for items stored in item database, block 705 (FIG. 7, described below) of retrieving historical transactions from transaction database, block 801 (FIG. 8, described below) of receiving an image of an item as input for training data for a machine learning model, and/or block 901 (FIG. 9, described below) of receiving an image of an item to predict a gender label from image embeddings.

In some embodiments, gender attribute system 310 also can include a text model system 513. In many embodiments, text model system 513 can at least partially perform block 420 (FIG. 4) of generating text embeddings using a text embedding model to represent the respective item description and the respective attribute values for the each item of the set of items, block 440 (FIG. 4) of training the text embedding model and a machine learning model using a neural loss function based on the graph, block 460 (FIG. 4) of automatically determining, based on the machine learning model, as trained, a gender label for each first item of the set of items in which the gender classification is unlabeled and in which a respective quantity of respective attribute values for the each first item is at least a predetermined threshold, block 480 (FIG. 4) of determining one or more recommended items that match the first gender label based on the gender labels determined by the machine learning model, block 702 (FIG. 7, described below) of extracting text and/or image data from the attribute and item data for items store in the item database, block 703 (FIG. 7, described below) of embedding text and/or image data into vector representations of the items using text embedding model, such as BERT, block 704 (FIG. 7, described below) of inputting the text embeddings and the data from the graph into a machine learning model to determine a gender label for an item, block 803 (FIG. 8, described below) of receiving output data of representation vectors based on text embeddings using a text embedding model, such as BERT, and/or block 804 (FIG. 8, described below) of transforming the representation vectors using a normalization technique, such as L2 normalization to input as training data for a machine learning model, as trained.

In some embodiments, gender attribute system 310 also can include an image model system 514. In many embodiments, image model system 514 can at least partially perform block 450 (FIG. 4) of training an image embedding model based on images of items from the item catalog database using loss equations to minimize a distance between text representations and image representations for the items, block 470 (FIG. 4) of determining, based on an image embedding model, as trained, a gender label for each second item of the set of items that does not meet the predetermined threshold, block 471 (FIG. 4) of transforming an image into a second vector representing the image using a residual neural network, block 480 (FIG. 4) of determining one or more recommended items that match the first gender label based on the gender labels determined by the machine learning model, block 708 (FIG. 7, described below) of inputting the image embeddings and the data from the graph into a machine learning model to determine a gender label for an item, block 802 (FIG. 8, described below) of transforming the image into a representation vector using ResNet and/or other suitable image embedding programs, block 805 (FIG. 8, described below) of a representation space, such as a latent space, using a machine learning model, as trained to determine a gender label of an item based on image data, block 806 (FIG. 8, described below) of generating a softmax loss function based on the output of the machine learning model, as trained, to determine the reliability of the output, block 902 (FIG. 9, described below) of transforming images into representation vectors using ResNet, block 903 (FIG. 9, described below) of a inputting the image vectors as training data for a machine learning model, as trained, to determine a gender label for an item based on images, and/or block 904 (FIG. 9, described below) of generating a softmax function during a final layer of a neural network classifier.

In some embodiments, gender attribute system 310 also can include a graph system 515. In many embodiments, graph system 515 can at least partially perform block 430 (FIG. 4) of generating a graph of the set of items from the item catalog database connected by a set of edges, block 706 (FIG. 7, described below) of retrieving co-view data from the historical transactions to determine pairs of items viewed together during a session on a website, and/or block 707 (FIG. 7, described below) of a creating a graph based on the co-view data of pairs of items co-viewed together.

In several embodiments, web server 320 can include a webpage system 521. Webpage system 521 can at least partially perform sending instructions to user computers (e.g., 350-351 (FIG. 3)) based on information received from communication system 511, and/or block 485 (FIG. 4) of sending instructions to display the one or more recommended items to the user.

Figure 6:
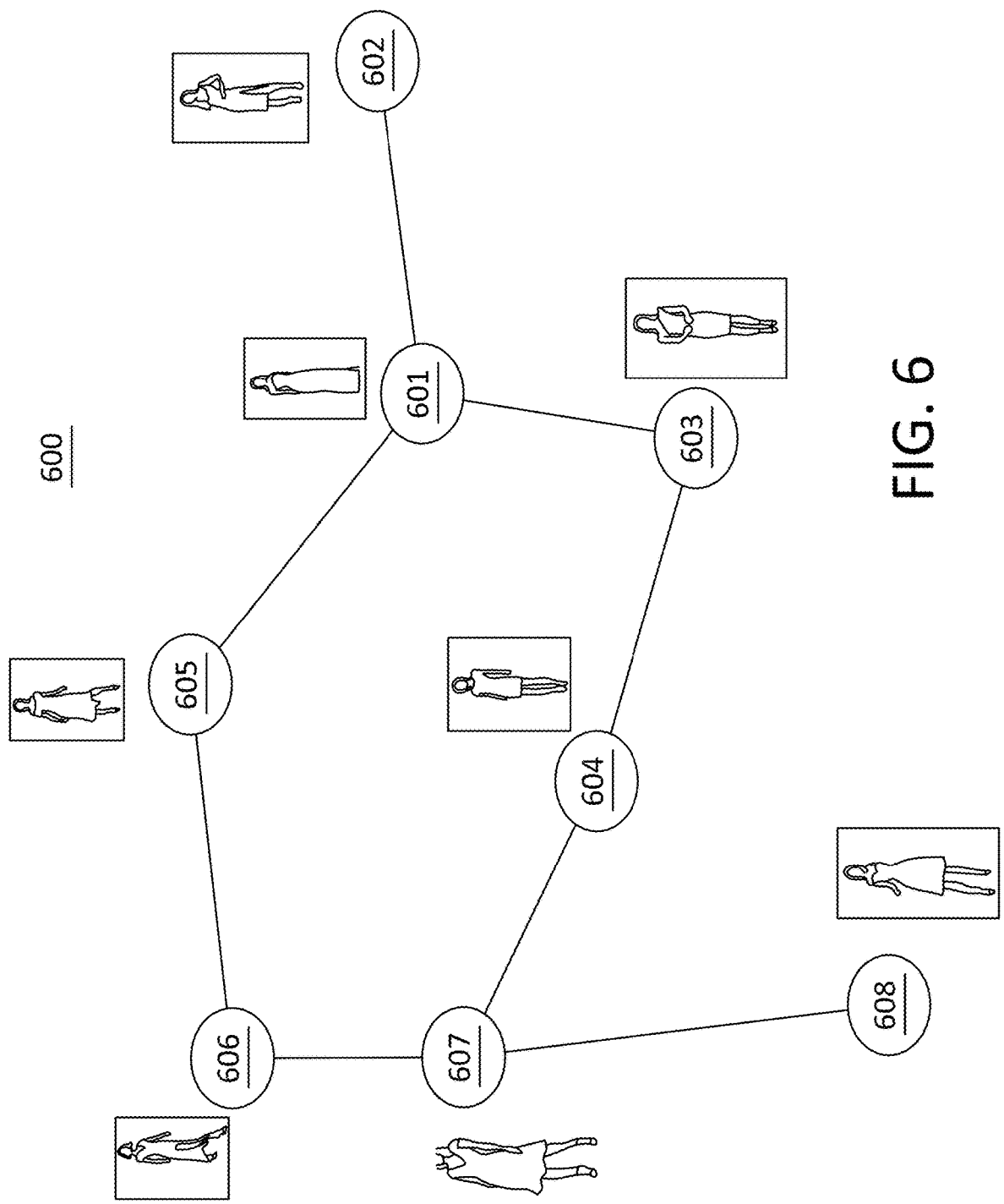
FIG. 6 illustrates an exemplary graph of nodes representing items in which pairs of the items were viewed together.

Turning ahead in the drawings, FIG. 6 illustrates an exemplary graph 600 of nodes representing items in which pairs of the items were viewed together. As shown in FIG. 6, graph 600 can include nodes, such as nodes 601-608 connected by edges. A pair of nodes (e.g., 601-608) can be connected by an edge when viewed together by a user in the same session. For example, nodes 601 and 602 are connected by an edge, which can indicate that nodes 601 and 602 were viewed together by in the same session by a user. In many embodiments, a weight of the edge can be based on co-view count, such as how many users viewed the two items together in respective sessions. The edges can be based on co-views by different users, such that nodes 601 and 602 were viewed together by a first user, and nodes 601 and 605 were viewed together by a second user.

In many embodiments, each of the nodes can include a vector representation of the item. For example, node 601 can be a vector representation of an item that is a red dress. The other nodes similarly can be for items that are dresses. In a number of embodiments, each node can be a vector representation of an item co-viewed with one or more other items and/or other nodes. Each node can be a labeled item or an unlabeled item, depending on whether the item has a gender label.

In some embodiments, graph 600 can be used to determine a gender label for one or more unlabeled nodes when the unlabeled nodes are connected to a labeled node. For example, node 601 is connected to nodes 602, 603, and 605, indicating that nodes 602, 603, and 605 were co-viewed with node 601 in one or more sessions. The vector representations of each of the nodes, 601, 602, 603, and 605 represent a respective item that is a respective women's dress. For some nodes, a gender classification is unlabeled, thus referred to as an unlabeled node. For example a gender label of female was assigned to node 601 (e.g., labeled node) and was co-viewed with an unlabeled node 603. Graph 600 can propagate the female gender label from node 601 to node 603 because both of nodes 601 and 603 are connected by an edge. In another example, two unlabeled nodes connected by an edge can remain unlabeled. For example, unlabeled node 607 and unlabeled node 608 can be connected to each other. Labeled node 604 can be connected to labeled node 603 and unlabeled node 607. A gender label from labeled node 603 can be propagated to unlabeled node 607, to change unlabeled node 607 into labeled node 607 with a gender label of female. Subsequently, newly labeled node 607 being connected to unlabeled node 608 and labeled node 606 can result in unlabeled node 608 being changed into labeled node 608, and so forth.

In some embodiments, training a machine learning model using a neural loss function can be based on input data, such as distances between embeddings for pairs of nodes connected by one or more labeled-labeled edges, labeled-labeled edges, and unlabeled-unlabeled edges.

Figure 7:
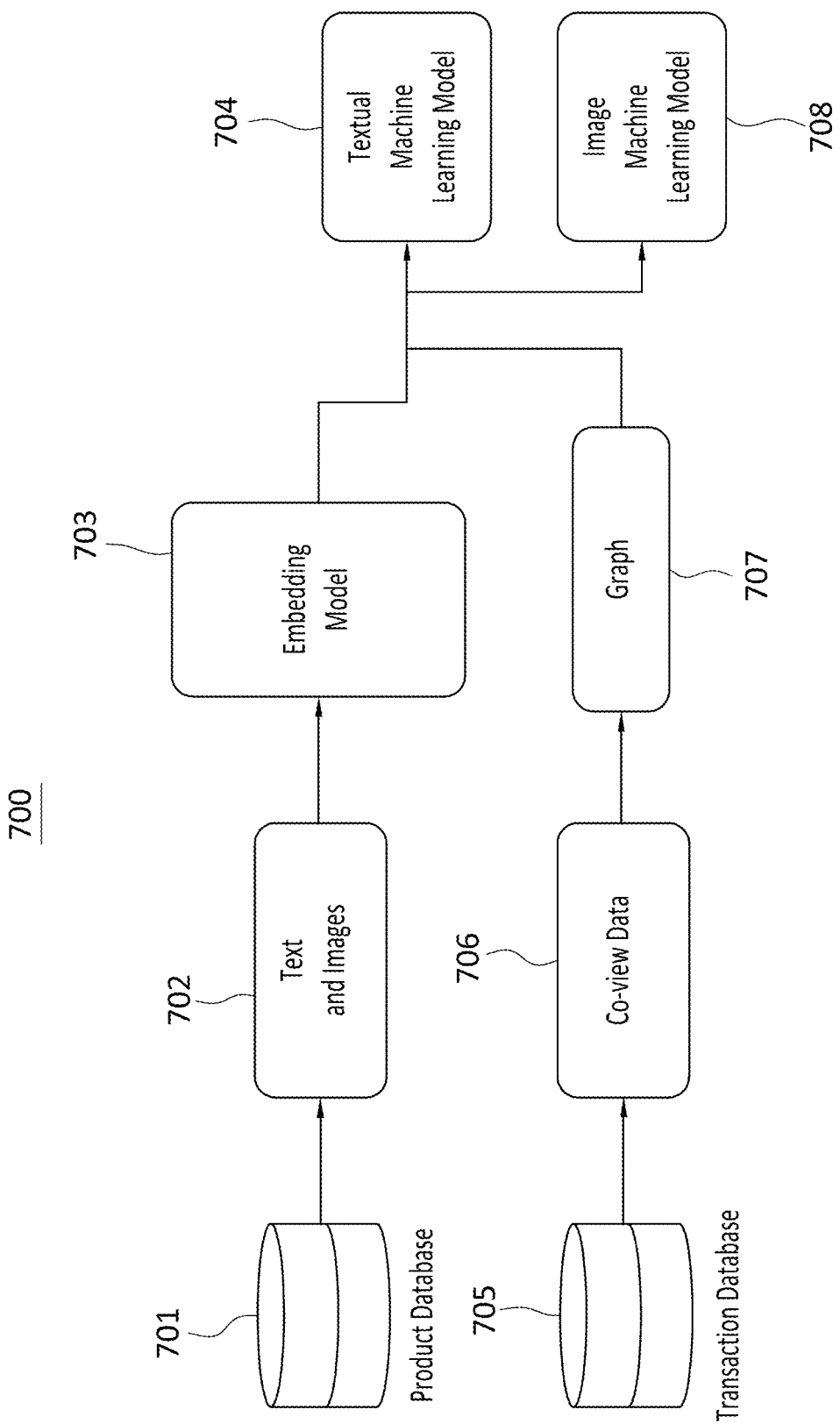
FIG. 7 illustrates flow chart for a method, according to another embodiment.

Turning ahead in the drawings, FIG. 7 illustrates flow chart for a method 700, according to another embodiment. Method 700 can be similar to method 400 (FIG. 4), and various procedures, processes, and/or activities of method 700 can be similar or identical to various procedures, processes, and/or activities of method 400 (FIG. 4). Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In several embodiments, system 300 (FIG. 3) can be suitable to perform method 700 and/or one or more of the activities of method 700.

In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as gender attribute system 310 and/or web server 320. The processor(s) can be similar or identical to the processor(s) described above with respect to computer system 100 (FIG. 1).

In many embodiments, method 700 can include a block 701 of retrieving attributes and item data for items stored in an item database (e.g., product database).

In some embodiments, method 700 also can include a block 702 of extracting text and/or image data from the attribute and item data for items store in the item database.

In various embodiments, method 700 further can include a block 703 of embedding text and/or image data into vector representations of the items using text embedding model, such as BERT. In many embodiments, text embeddings and/or vector representations can be used as training data in a machine learning model, as trained. In some embodiments, transforming an image into a vector can include using ResNet.

In several embodiments, method 700 additionally can include a block 704 of inputting the text embeddings and the data from the graph into a machine learning model to determine a gender label for an item.

In many embodiments, method 700 also can include a block 705 of retrieving historical transactions from a transaction database.

In some embodiments, method 700 further can include a block 706 of retrieving co-view data from the historical transactions to determine pairs of items viewed together during a session on a website. In many embodiments, pairs of items that were viewed and/or ordered (e.g., purchased) together during a session on a web site can be considered as co-viewed.

In various embodiments, method 700 additionally can include a block 707 of a creating a graph based on the co-view data of pairs of items co-viewed together. In many embodiments, the pairs of items can be a labeled item or an unlabeled item. In some embodiments, the connectivity between the nodes of each co-viewed item can be used as training data for a machine learning model for determining a gender label for an item.

In several embodiments, method 700 can include a block 708 of inputting the image embeddings and the data from the graph into a machine learning model to determine a gender label for an item. In some embodiments, block 708 can be used when text data for an item is insufficient for block 704 to produce reliable results. For example, block 708 can be used when the number of text attributes for an item is fewer than four.

Turning ahead in the drawings, FIG. 8 illustrates a flow chart for a method 800, according to another embodiment. In many embodiments, method 900 can be a method of training an image embedding model for determining a gender label. Method 800 can be similar to method 400 (FIG. 4), and various procedures, processes, and/or activities of method 800 can be similar or identical to various procedures, processes, and/or activities of method 400 (FIG. 4). Method 800 can be employed in many different embodiments and/or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In several embodiments, system 300 (FIG. 3) can be suitable to perform method 800 and/or one or more of the activities of method 800.

In these or other embodiments, one or more of the activities of method 800 can be implemented as one or more computing instructions configured to run at one or more processors and configured to be stored at one or more non-transitory computer-readable media. Such non-transitory computer-readable media can be part of a computer system such as gender attribute system 310 and/or web server 320. The processor(s) can be similar or identical to the processor(s) described above with respect to computer system 100 (FIG. 1).

In many embodiments, method 800 can include a block 801 of receiving an image of an item as input for training data for a machine learning model.

In some embodiments, method 800 can include a block 802 of transforming the image into a representation vector using a residual neural network (ResNet) and/or another suitable image embedding model.

In many embodiments, method 800 can include a block 803 of receiving output data of representation vectors based on text embeddings using a text embedding model, such as BERT.

In various embodiments, method 800 can include a block 804 of transforming the representation vectors using a normalization technique, such as L2 normalization to input as training data for a machine learning model.

In several embodiments, method 800 can include a block 805 of training the two vectors (e.g., the representation vector for the image embeddings generated in block 802 and the representation vector for the text embeddings) in an image embedding model for determining a gender label of an item based on image data. For example, a loss equation, such as equation 7 described above, can be used.

In various embodiments, method 800 can include a block 806 of applying a softmax classifier to the loss output to train the image embedding model.

Referring to the drawings FIG. 9 illustrates a flow chart for a method 900, according to another embodiment. In many embodiments, method 900 can be a method of using the image embedding model to determine a gender label. In various embodiments, method 900 can be used when text attributes of an item contain fewer than five (5) attributes. Method 900 can be similar to method 400 (FIG. 4), and various procedures, processes, and/or activities of method 900 can be similar or identical to various procedures, processes, and/or activities of method 400 (FIG. 4). Method 900 can be employed in many different embodiments and/or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In several embodiments, system 300 (FIG. 3) can be suitable to perform method 900 and/or one or more of the activities of method 900.

In these or other embodiments, one or more of the activities of method 900 can be implemented as one or more computing instructions configured to run at one or more processors and configured to be stored at one or more non-transitory computer-readable media. Such non-transitory computer-readable media can be part of a computer system such as gender attribute system 310 and/or web server 320. The processor(s) can be similar or identical to the processor(s) described above with respect to computer system 100 (FIG. 1).

In many embodiments, method 900 can include a block 901 of receiving an image of an item to predict a gender label from image embeddings.

In several embodiments, method 900 can include a block 902 of transforming the image received in block 901 into a representation vector using ResNet.

In some embodiments, method 900 can include a block 903 of a inputting the representation vector for the image into the image embedding model, as trained, to determine a gender label for the item based on the image. In particular, in one embodiment, block 903 can include using the representation vector for the image to determine the gender label for the item based on the image.

In various embodiments, method 900 can include a block 904 of applying the softmax classifier during to determine the gender label.

Figure 10:
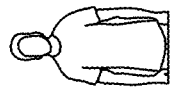
FIG. 10 illustrates an exemplary interface of a webpage showing a list of recommended items based on a male gender label for each item.

Turning ahead in the drawings, FIG. 10 illustrates an exemplary interface of a webpage showing a list of recommended items based on a male gender label for each item. As shown in FIG. 10, a top left item can be an anchor item selected by a user. The anchor item can be a shirt with a gender label of male. The other items shown as recommendations to the user can be items that also have a gender label of male, in which at least some of these recommended items were labeled using the techniques described herein.

Figure 11:
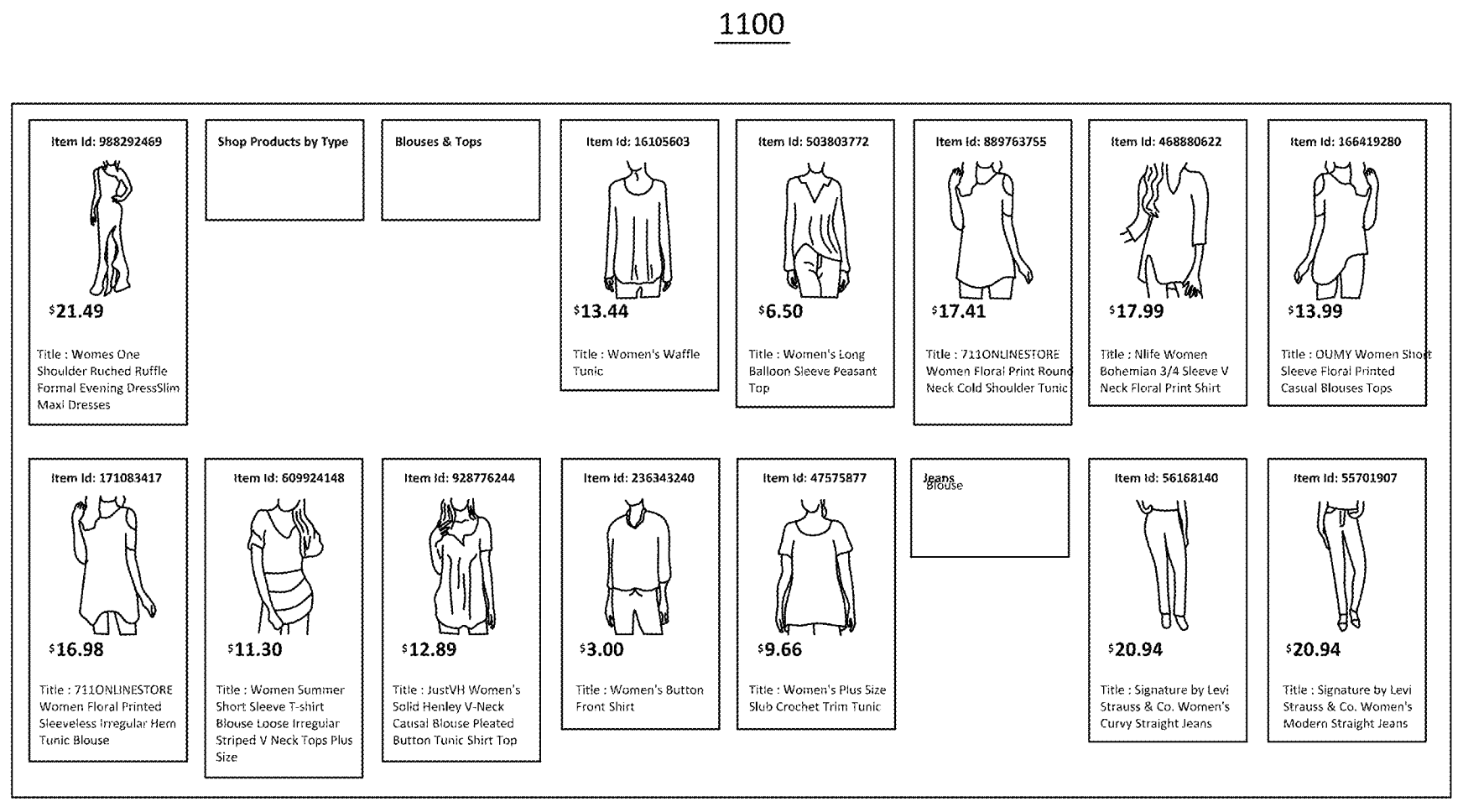

Referring to the drawings FIG. 11 illustrates an exemplary interface of a webpage showing a list of recommended items based on a female gender label for each item. As shown in FIG. 11, a top left item can be an anchor item selected by a user. The anchor item can be a dress with a gender label of female. The other items shown as recommendations to the user can be items that also have a gender label of female, in which at least some of these recommended items were labeled using the techniques described herein.

In many embodiments, the techniques described herein can provide several technological improvements. Conventionally, many online websites do not use gender attributes as a basis to select items to recommend to a user. When catalog data includes gender attribute data, it can include noisy gender attribute coverage often resulting with few items with reliable gender attribute coverage. A machine learning model can be trained to scale gender assignment across a catalog to reduce the number of recommendation errors based on recommending items for one gender intended to be recommended to another gender. The machine learning model can be trained to handle newly added items to a catalog reducing processing resources when a gender label is assigned simultaneously during processing to add the item to the catalog database. For example, an online catalog can include approximately one hundred million items and/or items at any given period of time.

In a number of embodiments, the techniques described herein can advantageously provide a consistent user experience by dynamically providing gender-aware recommendations of items in an online catalog increasing the visibility of items previously not discovered by the user. For example, an online catalog can include approximately one hundred million items and/or items at any given period of time.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of items sold on the website can exceed approximately ten million (10,000,000) approximately each day.

In a number of embodiments, the techniques described herein can solve a technical problem that arises only within the realm of computer networks, as determining a gender label for an item for which the gender classification is unlabeled in an online catalog does not exist outside the realm of computer networks. Moreover, the techniques described herein can solve a technical problem that cannot be solved outside the context of computer networks. Specifically, the techniques described herein cannot be used outside the context of computer networks, in view the text embedding model and a machine learning model using a neural loss function used in this invention, and because an online catalog that can power and/or feed an online website that is part of the techniques described herein would not exist.

Various embodiments can include a system. The system can include one or more processors and one or more non-transitory computer-readable media storing computing instructions configured to run on the one or more processors and perform certain acts. The acts can include receiving from an item catalog database a respective item description and respective attribute values for each item of a set of items. A gender classification of the respective attribute values for the each item of the set of items can be either labeled or unlabeled. The acts also can include generating text embeddings using a text embedding model to represent the respective item description and the respective attribute values for the each item of the set of items. The acts further can include generating a graph of the set of items from the item catalog database connected by a set of edges. Each pair of items of the set of items that can be connected by a respective edge of the set of edges in the graph has been viewed together in one or more respective sessions. The respective edge can include a weight that can include a co-view count. The set of edges can include (a) one or more unlabeled-unlabeled edges, (b) one or more labeled-unlabeled edges, and (c) one or more labeled-labeled edges. The acts further can include training the text embedding model and a machine learning model using a neural loss function based on the graph. The acts additionally can include automatically determining, based on the machine learning model, as trained, a gender label for each first item of the set of items in which the gender classification is unlabeled. The gender classification can include a respective quantity of respective attribute values for the each first item is at least a predetermined threshold.

Several embodiments can include a method. The method can be implemented via execution of computing instructions configured to run at one or more processors and stored at one or more non-transitory computer-readable media. The method can include receiving from an item catalog database a respective item description and respective attribute values for each item of a set of items. A gender classification of the respective attribute values for the each item of the set of items can be either labeled or unlabeled. The method also can include generating text embeddings using a text embedding model to represent the respective item description and the respective attribute values for the each item of the set of items. The method further can include generating a graph of the set of items from the item catalog database connected by a set of edges. Each pair of items of the set of items that can be connected by a respective edge of the set of edges in the graph has been viewed together in one or more respective sessions. The respective edge can include a weight that can include a co-view count and the set of edges comprises (a) one or more unlabeled-unlabeled edges, (b) one or more labeled-unlabeled edges, and (c) one or more labeled-labeled edges. The method also can include training the text embedding model and a machine learning model using a neural loss function based on the graph. The method further can include automatically determining, based on the machine learning model, as trained, a gender label for each first item of the set of items. The gender label for each first item of the set of items can include whether the gender classification is unlabeled. The gender classification can include a respective quantity of respective attribute values for the each first item is at least a predetermined threshold.

A number of embodiments include a system. The system including one or more processors and one or more non-transitory computer-readable media storing computing instructions that, when executed on the one or more processors, cause the one or more processors to perform certain acts. The acts can include receiving a respective item description and at least one respective attribute value for each item of a set of items. The acts also can include generating at least one respective text embedding using a text embedding model for each item of the set of items. The acts further can include generating a graph of the set of items based on at least co-view data to create pairs of items that are co-viewed by joining respective pairs of items that are connected by a set of edges. Each pair of items joined by a respective edge of the set of edges in the graph can be viewed together in one or more respective sessions. The respective edge includes a respective weight including a co-view count of a respective pair of items. The acts additionally can include training the text embedding model and a machine learning model using a neural loss function based on the graph. The acts also can include automatically determining, using the machine learning model, as trained, a label for each item of the set of items.

Various embodiments include a method. The method being implemented via execution of computing instructions configured to run on one or more processors and stored at one or more non-transitory computer-readable media. The method can include receiving a respective item description and at least one respective attribute value for each item of a set of items. The method also can include generating at least one respective text embedding using a text embedding model for each item of the set of items. The method further can include generating a graph of the set of items based on at least co-view data to create pairs of items that are co-viewed by joining respective pairs of items that are connected by a set of edges. Each pair of items joined by a respective edge of the set of edges in the graph can be viewed together in one or more respective sessions. The respective edge includes a respective weight including a co-view count of a respective pair of items. The method additionally can include training the text embedding model and a machine learning model using a neural loss function based on the graph. The method also can include automatically determining, using the machine learning model, as trained, a label for each item of the set of items.

Although gender attribute assignment using a multimodal neural graph has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4 and/or 7-9 may include different procedures, processes, and/or activities and be performed by many different modules, in many different orders, and/or one or more of the procedures, processes, or activities of FIGS. 4 and/or 7-9 may include one or more of the procedures, processes, or activities of another different one of FIGS. 4 and/or 7-9. As another example, the systems within a gender attribute system 310 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
   one or more processors; and
   one or more non-transitory computer-readable media storing computing instructions that, when executed on the one or more processors, cause the one or more processors to perform functions comprising:
      receiving a respective item description and at least one respective attribute value for each item of a set of items;
      generating at least one respective text embedding using a text embedding model for each item of the set of items;
      generating a graph of the set of items based on at least co-view data to create pairs of items that are co-viewed by joining respective pairs of items that are connected by a set of edges, wherein each pair of items joined by a respective edge of the set of edges in the graph has been viewed together in one or more respective sessions, and the respective edge comprises a respective weight comprising a co-view count of a respective pair of items;
      training the text embedding model and a machine learning model using a neural loss function based on the graph; and
      automatically determining, using the machine learning model, as trained, a label for each item of the set of items.

2. The system of claim 1, wherein:
   the text embedding model is a Bidirectional Encoder Representations from Transformers ("BERT"); and
   an output from the text embedding model comprises a vector representation.

3. The system of claim 1, wherein the set of edges comprises (a) one or more unlabeled-unlabeled edges, (b) one or more labeled-unlabeled edges, and (c) one or more labeled-labeled edges.

4. The system of claim 1, wherein training the text embedding model and the machine learning model using the neural loss function based on the graph further comprises:
   training the machine learning model with the neural loss function based on first distances between first text embeddings for first pairs of nodes connected by one or more labeled-labeled edges, second distances between second text embeddings for second pairs of nodes connected by one or more labeled-unlabeled edges, third distances between third text embeddings for third pairs of nodes connected by one or more unlabeled-unlabeled edges, and a softmax loss cost function for fourth text embeddings of nodes of the graph that are labeled.

5. The system of claim 1, wherein the computing instructions, when executed on the one or more processors, further cause the one or more processors to perform a function comprising:
   determining, based on an image embedding model, as trained, a label for each second item of the set of items that does not meet a predetermined threshold.

6. The system of claim 5, wherein the predetermined threshold is 5.

7. The system of claim 5, wherein the computing instructions, when executed on the one or more processors, further cause the one or more processors to perform a function comprising:
   transforming an image into a vector representing the image using a residual neural network ("ResNet").

8. The system of claim 1, wherein the computing instructions when executed on the one or more processors, further cause the one or more processors, to perform a function comprising:
   training an image embedding model based on images of items from an item catalog database using loss equations to minimize a distance between text representations and image representations for the items.

9. The system of claim 8, wherein the images of the items from depict items of clothing.

10. The system of claim 1, wherein the at least one respective attribute value comprises a gender classification.

11. A method being implemented via execution of computing instructions configured to run on one or more processors and stored at one or more non-transitory computer-readable media, the method comprising:

receiving a respective item description and at least one respective attribute value for each item of a set of items;

generating at least one respective text embedding using a text embedding model for each item of the set of items;

generating a graph of the set of items based on at least co-view data to create pairs of items that are co-viewed by joining respective pairs of items that are connected by a set of edges, wherein each pair of items joined by a respective edge of the set of edges in the graph has been viewed together in one or more respective sessions, and the respective edge comprises a respective weight comprising a co-view count of a respective pair of items;

training the text embedding model and a machine learning model using a neural loss function based on the graph; and automatically determining, using the machine learning model, as trained, a label for each item of the set of items.

12. The method of claim 11, wherein:

the text embedding model is a Bidirectional Encoder Representations from Transformers ("BERT"); and an output from the text embedding model comprises a vector representation.

13. The method of claim 11, wherein the set of edges comprises (a) one or more unlabeled-unlabeled edges, (b) one or more labeled-unlabeled edges, and (c) one or more labeled-labeled edges.

14. The method of claim 11, wherein training the text embedding model and the machine learning model using the neural loss function based on the graph further comprises:

training the machine learning model with the neural loss function based on first distances between first text embeddings for first pairs of nodes connected by one or more labeled-labeled edges, second distances between second text embeddings for second pairs of nodes connected by one or more labeled-unlabeled edges, third distances between third text embeddings for third pairs of nodes connected by one or more unlabeled-unlabeled edges, and a softmax loss cost function for fourth text embeddings of nodes of the graph that are labeled.

15. The method of claim 11 further comprising:

determining, based on an image embedding model, as trained, a label for each second item of the set of items that does not meet a predetermined threshold.

16. The method of claim 15, wherein the predetermined threshold is 5.

17. The method of claim 15 further comprising:

transforming an image into a vector representing the image using a residual neural network ("ResNet").

18. The method of claim 11 further comprising:

training an image embedding model based on images of items from an item catalog database using loss equations to minimize a distance between text representations and image representations for the items.

19. The method of claim 18, wherein the images of the items from the item catalog database depict items of clothing.

20. The method of claim 11, wherein the at least one respective attribute value comprises a gender classification.

* * * * *